H. B. AYRES.
CHECK BOOK.
APPLICATION FILED JUNE 22, 1914.
1,277,284.
Patented Aug. 27, 1918.
3 SHEETS—SHEET 2.
Witnesses:
Inventor
Harold B. Ayres
by
Attorney

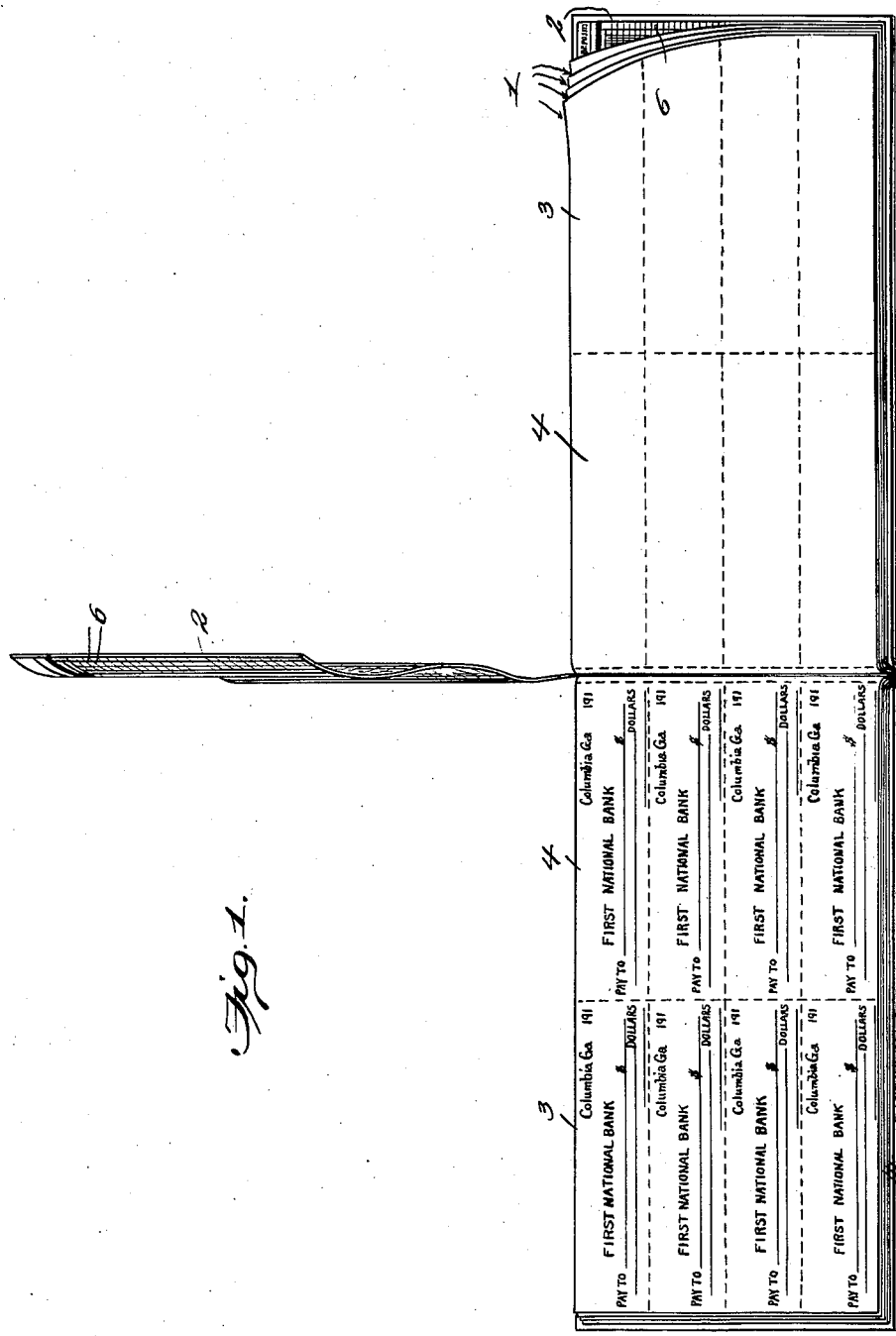

H. B. AYRES.
CHECK BOOK.
APPLICATION FILED JUNE 22, 1914.

1,277,284.

Patented Aug. 27, 1918.
3 SHEETS—SHEET 3.

Inventor
Harold B. Ayres

UNITED STATES PATENT OFFICE.

HAROLD B. AYRES, OF COLUMBIA, SOUTH CAROLINA.

CHECK-BOOK.

1,277,284. Specification of Letters Patent. Patented Aug. 27, 1918.

Application filed June 22, 1914. Serial No. 846,612.

*To all whom it may concern:*

Be it known that I, HAROLD B. AYRES, a citizen of the United States, residing at Columbia, in the county of Richland and State of South Carolina, have invented new and useful Improvements in Check-Books, of which the following is a specification.

My present invention has for its object to provide an improved check-book which contains not only check-blanks but also pages ruled or arranged appropriately to receive entries of data to constitute a record of each check issued and also distribution entries of the item or items covered by each check in appropriate columns whereby a complete record of all banking transactions is provided in a single book, thus dispensing with the inconvenience and expense of keeping a separate cash-book, journal, ledger or other books, as heretofore practised. Preferably, the check-book contains pages of double banks of check-blanks and also interleaved pages having forms to receive the entries of the data above referred to, such an arrangement enabling all the pages of the book to be of the same size and providing ample spaces for the various entries.

To these and other ends, the invention consists in certain improvements, and combinations and arrangements of parts, all as will be hereinafter more fully described, the novel features being pointed out particularly in the claims at the end of the specification.

In the accompanying drawings:—

Figure 1 is a perspective view of a check-book embodying my invention, the same being opened;

Fig. 2 is a view of that side of the record sheet which receives data pertaining to checks issued; and Fig. 3 is a view of the reverse side of the record sheet adapted to receive data pertaining to cash received.

Similar parts are designated by the same reference characters in the several views.

A check-book embodying the present invention comprises pages of check-blanks 1 and record pages 2, the latter being appropriately interleaved between groups of the pages of check-blanks and all the pages being suitably bound together into book form. It is preferable, as shown in the present instance, to provide two banks or columns of check-blanks 3 and 4 on each of the pages 1, there being in the instance shown four check-blanks in each bank or column with a total of eight check-blanks on each of the pages 1. Each record page 2 follows a suitable number of pages of check-blanks and is divided by the lines or rulings 6 to form horizontal spaces corresponding to the number of check-blanks in the preceding group of pages 1. In the present instance, the left-hand portion of the record page 2 has a vertical column 7 to receive the date of each check, a vertical column 8 to receive the names of the payees of the checks, a vertical column 9 to receive an entry indicating the purpose for which the check is issued, and a vertical column 10 to receive the amounts of the checks. To the right of the columns just mentioned, the record page 2 is ruled to provide an appropriate number of vertical columns 11, and these vertical columns correspond to different accounts against which the various checks issued are chargeable, for which purpose they are provided with spaces to receive appropriate headings to facilitate the making of the entries therein and examination of these columns to determine the individual or total amounts charged against such accounts. As each check is issued, the date of the check is entered in the column 7, the name of the payee is entered in the column 8, the purpose of the check is entered in the column 9, and the amount of the check is entered in the column 10. Where the check is chargeable against a single account, the amount of the check is then entered in the appropriate column 11, and where the check covers items which are chargeable against more than one account, the amounts of the different items are entered in the appropriate columns 11. By this arrangement, all data pertaining to the issuance of any check can be determined quickly and without liability of error by examining the entries contained in the horizontal space allotted to that particular check, and by adding the entries in the vertical columns 11, the total amounts chargeable against the different accounts represented by these vertical columns can be determined at once. Preferably, the record sheet 2 is adapted to also receive entries of deposits. In the present instance, the right-hand edge of the record sheet 2 is ruled to provide a vertical column 12 to receive the dates of the various deposits and to provide a vertical column 13 to receive entries of the amounts of such deposits.

The reverse side of each record sheet 2 is preferably ruled to provide a form to receive entries of all cash received. Fig. 3 shows the reverse side of the record sheet 2, it having a vertical column 14 to receive entries of the dates upon which the different cash items are received, a vertical column 15 to receive the names of the parties from whom the cash is received, a vertical column 16 to receive entries of the purpose for which the different cash items are received, and a vertical column 17 to receive entries of the amounts of the different cash items. A suitable number of vertical columns 18 are also preferably provided to represent different accounts to which the various cash items are to be applied, this page or form being ruled horizontally with all the data pertaining to each item in the same horizontal space, and by adding the items in the vertical columns 18, the total amounts pertaining to the respective accounts can be determined.

By providing two banks of check blanks on each of the pages 1, the pages 1 and 2 can be made the same size and the record pages 2 will be of ample size to provide sufficient spaces for the various entries to be made thereon.

I claim as my invention:—

1. A check-book comprising sheets each containing two vertical banks of check-blanks, and record sheets interleaved between groups of sheets of check-blanks, each record sheet being ruled to provide horizontal spaces having indicia designating entries pertaining to each check issued from the corresponding group of check-blanks and to provide vertical ledger-account columns having indicia designating entries of the items distributed according to the different ledger accounts represented by said vertical columns.

2. A check-book comprising sheets containing check-blanks, and record sheets interleaved between groups of sheets of check-blanks, each record sheet having a debit side provided with horizontal spaces having indicia designating entries pertaining to cash received and vertical ledger-account columns having indicia designating entries of the amounts received, said amounts being distributed according to the ledger accounts represented by said vertical columns, and each record sheet also having a credit side provided with horizontal spaces having indicia designating entries pertaining to checks issued and vertical ledger-account columns having indicia designating entries of the amounts of the checks issued, the latter entries being distributed according to the ledger accounts represented by said last-mentioned columns.

In testimony whereof I have hereunto set my hand in presence of two subscribing witnesses.

HAROLD B. AYRES.

Witnesses:
C. A. BATEMAN,
CHAS. S. HYER.